(12) United States Patent
Bacon et al.

(10) Patent No.: US 9,003,169 B2
(45) Date of Patent: Apr. 7, 2015

(54) SYSTEMS AND METHODS FOR INDIRECT REGISTER ACCESS USING STATUS-CHECKING AND STATUS-SETTING INSTRUCTIONS

(75) Inventors: David F. Bacon, Sleepy Hollow, NY (US); Xiaowei Shen, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/404,957

(22) Filed: Mar. 16, 2009

(65) Prior Publication Data

US 2009/0235035 A1     Sep. 17, 2009

Related U.S. Application Data

(62) Division of application No. 10/959,609, filed on Oct. 5, 2004, now Pat. No. 7,516,306.

(51) Int. Cl.
    *G06F 9/30*             (2006.01)
    *G06F 9/44*             (2006.01)

(52) U.S. Cl.
    CPC ............ *G06F 8/314* (2013.01); *G06F 9/30076* (2013.01); *G06F 9/30098* (2013.01)

(58) Field of Classification Search
    CPC ............ G06F 9/30076; G06F 9/30098; G06F 9/30101
    USPC ........................................................ 712/220
    See application file for complete search history.

(56) References Cited

U.S. PATENT DOCUMENTS

| | | | |
|---|---|---|---|
| 5,546,554 A * | 8/1996 | Yung et al. | ................ 711/203 |
| 5,555,432 A | 9/1996 | Hinton | |
| 5,802,386 A | 9/1998 | Kahle | |
| 5,958,041 A | 9/1999 | Petolino | |
| 6,308,261 B1 | 10/2001 | Morris et al. | |
| 7,181,599 B2 | 2/2007 | DeWitt, Jr. | |

FOREIGN PATENT DOCUMENTS

| | | | |
|---|---|---|---|
| EP | 0933698 A2 | 8/1999 | |
| EP | 0933698 A3 | 8/1999 | |

OTHER PUBLICATIONS

Arvind et al., I-Structures: data structures for parallel computing, ACM Trans. Program. Lang. Syst. 11, 4 (Oct. 1989), pp. 598-632.
Culler et al., Parallel Programming in Split-C, Supercomputing (1993), pp. 262-273.
Horowitz et al., Informing memory operations: memory performance feedback mechanisms and their applications, ACM Trans. Comput. Syst. 16, 2 (1998), pp. 170-205.

(Continued)

*Primary Examiner* — David J Huisman
(74) *Attorney, Agent, or Firm* — Ference & Associates LLC

(57) ABSTRACT

The present invention broadly contemplates braids and fibers, high-level programming constructs which facilitate the creation of programs that are partially ordered, to address the continuing trend of ever-increasing processor speeds and attendant increases in memory latencies. These partial orders can be used to respond adaptively to memory latencies. It is shown how these constructs can be effectively supported with simple and inexpensive instruction set and micro-architectural extensions.

8 Claims, 21 Drawing Sheets

(56) References Cited

OTHER PUBLICATIONS

Intel Corp., IA-64 Application Developer's Architecture Guide, 1999, 476 pages.

Mowry et al., Software-controlled multithreading using informing memory operations, Proceedings of the Sixth International Symposium on High-Performance Computer Architecture (Toulouse, France, Jan. 2000) pp. 121-132.

Tendler et al., POWER4 system microarchitecture, IBM J. Res. Dev. 46, 1 (Jan. 2002), pp. 5-25.

Bacon, D.F., and Shen, X., "Braids and Fibers: Language Constructs with Architectural Support for Adaptive Response to Memory Latencies," IBM Research Development, 50, 2/3, 2006, pp. 209-221, IBM Corporation, Riverton, NJ.

McCarthy, J., Recursive Functions of Symbolic Expressions and Their Computation by Machine, Part I, pp. 1-34 (published in Commun. ACM 3, 4 (1960)).

Wulf et al., Hitting the Memory Wall: Implications of the Obvious, pp. 20-24, (Dec. 1994) (published in SIGARCH Computer Architecture News 23, 1).

\* cited by examiner

```
void histogram(int vals[], int hist[]) {
    for (int i=0; i<vals.length; i++) {
        int d = vals[i] %hist.length;
        hist [d] ++;
    }
}
```

FIG. 1
*Sequential Histogram Calculation*

```
void histogram(int vals[], int hist[]) {
    intQ q = new intQ(32);
    int i = 0;

while (i<vals.length) {
        for (; i<vals.length && ! q.full(); i++) {
            int d = vals[i] % hist.length;
            if (updatenow hist[d])
                hist[d]++;
            else {
                want hist[d];
                q.put(d);
            }
        } while (! q.empty()) {
            int d = q.get();
            hist[d]++;
        }
    }
}
```

FIG. 2
*Histogram Calculation with Explicit Work Deferral*

```
computeHistogram(int vals[], int buckets) {
    int hist[] = new int[buckets];
    braid Histogram(vals, hist):
    displayHistogram(hist);
} braid class Histogram {
    final int vals[];
    final int hist[];

public Histogram(int v[], int h[]) {
        vals = v; hist = h;

for each (int i = 0; vals.length-1) {
            int d = vals[i] % hist.length;
            UPDATE(hist[d]);
        }
    } void fiber UPDATE(update int bucket) {
        bucket++;
    }
}
```

FIG. 3

*Braided Histogram Calculation*

```
dcbq addr
    CR7[SO] ← 0
    CR7[LT,GT] ← Latency [addr]
    if Local[addr]
            CR7[EQ] ← 1
        else
            CR7[EQ] ← 0
```

FIG. 4A
*Data Cache Block Query*
*(Inquiring Memory Instructions)*

```
dcbqst addr
    CR7[SO] ← 0
    CR7[LT,GT] ← Latency [addr]
    if Local[addr] ^CachedExclusive[addr]
        CR7[EQ] ← 1
      else
        CR7EQ ← 0
```

FIG. 4B
*Data Cache Block Query for Store*
*(Inquiring Memory Instructions)*

*State transitions for a memory transaction identifier and the corresponding user-visible bit in the Memory Transaction Register*

```
dcbp Rn, addr
    CR7[LT,GT] ← Latency [addr]
    if Local[addr]
        CR7[EQ] ← 1
        CR7[SO] ← 0
    else if MTR ≠ ⁶⁴1
        CR7[EQ] ← 0
        CR7[SO] ← 0
        Rn ← GetTransactionID(MTR)
        InitiateLoad[addr]
        (On completion, MTR[RN] ←1)
    else
        CR7[EQ] ← 0
        CR7[SO] ← 1
```

FIG. 6A

*Data Cache Block Prepare for load*
*(Split-phase Prepare Instructions)*

```
dcbpst Rn, addr
    CR7[LT,GT] ← WriteLatency [addr]
    if Local[addr] ∧ CachedExclusive[addr]
        CR7[EQ] ← 1
        CR7[SO] ← 0
    else if MTR ≠ ⁶⁴1
        CR7[EQ] ← 0
        CR7[SO] ← 0
        Rn ← GetTransactionID(MTR)
        InitiateLoadExclusive[addr]
        (On completion, MTR[Rn] ←1)
    else
        CR7[EQ] ← 0
        CR7[SO] ← 1
```

FIG. 6B

*Data Cache Block Prepare for Store*
*(Split-phase Prepare Instructions)* mfmtr Rn
    Rn ← [MTR]

FIG. 7A
*Move From MTR Instruction*
*(Memory Transaction Register (MTR) Instructions)* mtrfree Rn
    Free TransactionID(MTR[Rn])

FIG. 7B
*MTR Free transaction identifier Instruction*
*(Memory Transaction Register (MTR) Instructions)* mtrcir
    FreeTransactionID(MTR[0...63])

FIG. 7C
*MTR Clear transaction identifiers Instruction*
*(Memory Transaction Register (MTR) Instructions)* cntzb Ra, Rs
    c ← 0
    for (n ← 0; n<64; n++) c ← c+ ¬ $(Rs)_n$
    Ra ← c

FIG. 7D
*Count Zero Bits Instruction*
*(Memory Transaction Register (MTR) Instructions)* bma  addr                           Available
    IFAR ← addr if CR7[EQ] =1
bmna  addr                          Not Available
    IFAR ← addr if CR7[EQ] =0
bms  addr                           Slow
    IFAR ← addr if CR7[LT] =1
bmf  addr                           Fast
    IFAR ← addr if CR7[LT] =0
bmta  addr                          Transaction Available
    IFAR ← addr if CR7[SO] =0
bmtna  addr                         Transaction Not Available
    IFAR ← addr if CR7[SO] =1

FIG. 8

*Branch Mnemonics. Branch if Memory...*

```
class MarkStack   {
   private final ObjectStack stack;

MarkStack(Object[] roots)   {
      stack = ObjectStack.create(roots);
   } void mark ()   {
       while (! stack.empty()){
          Object X = stack.pop();
           markObject(X);
        }
     }
} void markObject(X)   {
   if (! X.mark)   {
      X.mark = true;
      offsets = X.class.offsets():
      for (int i = 0; i < offsets.length; i++)
       {
         pointer = Peek(ADDRESS(X) +offsets[i]);
         if (pointer != null)
            stack.push(pointer);
       }
      }
     }
    }
   }
```

FIG. 9

*Sequential Garbage Collector Mark Phase*

```
void mark() {
  Queue deferredQ = new Queue(QUEUESIZE);
  while (! stack.empty()) {
    while (! stack.empty()) {
      X = stack.pop();
      if (READNOW(* X))
        markObject(X);
      else {
        WANT * X;
        deferredQ.add(X);
        if (deferredQ.full())
          markDeferred(deferredQ);
      }
    }
    markDeferred(deferredQ);
  }
} void markDeferred(Queue Q) {
  while (! Q.empty()) {
    Object X = Q.remove();
    markObject(X);
  }
}
```

FIG. 10

*Garbage Collector Mark Phase With Explicit Work Deferral*

```
braid class GCMark {
   final ObjectStack stack;

GCMark(Object[] roots) {
      stack = ObjectStack.create(roots);

WHILE EACH (! markStack.empty()) {
         Object X = markStack.pop();
         MARK(* X);
      }
   } void fiber MARK(read Object o) {
      markObject(o);
   }
}
```

FIG. 11

*Braided Garbage Collector Mark Phase*

```
BRAID class SparseMatMuller {
    final SparseMatrix m;
    final double [] v;
    final double [] d;

public SparseMatMuller(SparseMatrix mx,
                    double [] vx, double [] dx)
    {
       m = mx;  v = vx;  d = dx;

FOR EACH (int i = 0  :  m.rows-1)
          for (int j = m.rowpos[i];
                   j < m.rowpos[i+1]; j++)
             // Live at call; i, j, j loop bound
             d[i] += PRODUCT (m.data[j].value,
                              v[m.data[j].index]);
    }
    double FIBER PRODUCT (READ double & melem,
                          READ double & volom)
    {
       return melem * velem;
    }
} class SparseMatrix   {
   int rows, cols;

int[] rowpos;
   SparseElem[] data;
} value SparseElem  {
   double value;
   int index;

SparseElem(double v, int i)  {
      value = v; index = i;
   }

SparseElem() {
      SparseElem (0.0,  0);
   }
}
```

FIG. 12
*Braided Sparse Matrix-Vector Multiply*

```
BRAID
    for (int i=0; i < A.length; i++)  {
       e = A[i];
       WHEN HERE (e.key) USE (e)
           f(e)
    }
```

FIG. 13A
*High-level Code that performs work f(e)
for every element e of array A.
(The WHEN Statement and Its Translation.)*

| | | | |
|---|---|---|---|
| BEGIN: | | ; | R6 (on entry); array pointer A |
| | lwz R7, length (R6) | ; | get array length |
| | cmpwi R7, 0 | ; | empty array? |
| | b END | ; | skip things |
| | sldi R7, R7, 3 | ; | convert length to word index |
| | li R31, 0 | ; | R31: deferred load mask |
| | li R8, 0 | ; | R8: index variable i |
| loop: | lwzx R0, R6, R8 | ; | e = A[i] |
| | bl when | ; | perform body of when statement |
| | addi R8, R8, 4 | ; | i++ |
| | cmpw R8, R7 | ; | at end of array? |
| | bit loop | ; | no, do next piece of work |
| finish: | bl dodefer | ; | try to do deferred work |
| | cmpwi R31, 0 | ; | any outstanding loads? |
| | bne finish | ; | yes.  keep draining |
| END: | | | |

FIG. 13B
*POWERAssembly code for main loop and FINISH statement.
(The WHEN Statement and Its Translation.)*

```
when:      DCBP R1, key(R0)        ;   prepare for load
           BMNA miss               ;   if memory not available, handle
hit:       lwz R2, key(R0)         ;   load key (won't block)
           [ f() ]                 ;   got data: process it
           blr                     ;   return miss:      BMTNA notags            ;   handle tag unavailable
           bitset R31, R31, R1     ;   add new deferred load to mask
           sldi R1, R1, 3          ;   convert tag to word offset
           stw R0, deftbl(R1)      ;   place e in deferred table dodefer:   MFMTR R3                ;   get tag vector
           and R3, R3, R31         ;   mask out other deferred loads
           cntlzw R1, R3           ;   get index of first available value
           cmpwi CR3, R1, 64       ;   none found?
             beqlr CR3             ;      then done; return
           mtrfree R1              ;   got one. free memory tag
           bitclr R31, R31, R1     ;   remove from mask of deferred loads
           sldi R1, R1, 3          ;   convert tag index to word offset
           lwz R0, deftbl(R1)      ;   get saved e from table
           b hit                   ;   go back and do the work notags:    mflr R30                ;   save the return address
           mr R29, R0              ;   save e ; save     R29/R30 in RAM???

work:      bl dodefer              ;   now try to do deferred work
             bne CR3, work         ;      more? then keep doing it
           mtlr R30                ;   restore return address
           mr R0, R29              ;   restore e
           b when                  ;   retry original load
```

FIG. 13C
*POWER Assembly code for WHEN statement body using split-phase load, miss handler, and processing of deferred work. (The WHEN Statement and Its Translation.)*

```
BRAID
    for (int i=0; i < A.length; i++)   {
        e =A[i];
        WHEN HERE (e.key.string[0]) USE (e)
            f(e.key.string)
    }
```

FIG. 14A
*High-level Code that performs work f(e)*
*for every element e of array A.*
*(A Complex WHEN Statement and Its Translation.)*

| | | | |
|---|---|---|---|
| when: | DCBP R1, key(RO) | ; | prepare for load of key field |
| | BMNA miss1 | ; | if memory not available, handle |
| hit1: | lwz RO, key(RO) | ; | load key |
| | DCBP R1, string (RO) | ; | prepare for load of string field |
| | BMNA miss2 | ; | if memory not available, handle |
| hit2: | lwz RO, string (RO) | ; | load string |
| | DCBP R1, 0(RO) | ; | prepare for load of first string char |
| | BMNA miss3 | ; | if memory not available, handle |
| hit3: | lha R2, 0(RO) | ; | load first char of string |
| | [ f() ] | ; | got data: process it |
| | blr | ; | return |
| miss1: | li R2, #hit1 | ; | setup to return to hit1 when load completes |
| | b miss | ; | goto shared miss handler |
| miss2: | li R2, #hit2 | ; | setup to return to hit2 when load completes |
| | bmiss | ; | goto shared miss handler |
| miss3: | li R2, #hit3 | ; | setup to return to hit3 when load completes |
| miss: | BMTNA notags | ; | handle tog unavailable |
| | bitset R31, R31, R1 | ; | add new deferred load to mask |
| | sldi R2, R1, 3 | ; | convert tog to word pair offset |
| | stw RO, deftbl(R1) | ; | place e in deferred table |
| | stw R2, deftbl+8(R1) | ; | place restart address in deferred table |
| dodefer: | MFMTR R3 | ; | get tag vector |
| | and R3, R3, R31 | ; | mask out other deferred loads |
| | cntlzw R1, R3 | ; | get index of first available value |
| | cmpwi DR3, R1, 64 | ; | none found? |
| | beqir CR3 | ; | then done; return |
| | mtrfree R1 | ; | got one. free memory tog |
| | bitcir R31, R31, R1 | ; | remove from mask of deferred loads |
| | sldi R1, R1, 3 | ; | convert tag index to word pair offset |
| | lwz R0, deftbl(R1) | ; | get saved e from table |
| | lwz R2, deftbl+B(R1) | ; | get saved restart address from table |
| | mtctr R2 | ; | prepare to jump to restart address |
| | bctr | ; | go back and do the work |
| notags: | mflr R30 | ; | save the return address |
| | mr R29, RO | ; | save e |
| | addi R28, R2, -16 | ; | save restart address |
| | | ; | (adjust to DCBP instruction) |
| work: | bl dodefer | ; | now try to do deferred work |
| | bne CR3, work | ; | more? then keep doing it |
| | mtlr R30 | ; | restore return address |
| | mr R0, R29 | ; | restore e |
| | mtctr R28 | ; | prepare to jump to restart address |
| | bctr | ; | retry original load |

FIG. 14B
POWERAssembly code for WHEN statement body
illustrating handling of cascading split-phase loads.
(A Complex WHEN Statement and its Translation.)

SYSTEMS AND METHODS FOR INDIRECT REGISTER ACCESS USING STATUS-CHECKING AND STATUS-SETTING INSTRUCTIONS

CROSS REFERENCE TO RELATED APPLICATION

This application is a divisional application of U.S. patent application Ser. No. 10/959,609, filed Oct. 5, 2004, issued as U.S. Pat. No. 7,516,306 on Apr. 7, 2009, which is incorporated by reference as if fully set forth herein.

GOVERNMENT INTERESTS

This invention was made with Government support and under contract no. NBCH3039004 awarded by DARPA. The Government has certain rights in this invention.

FIELD OF THE INVENTION

The present invention relates generally to instructions and operations configured for response to latencies.

BACKGROUND OF THE INVENTION

Herebelow reference is made to several references that are listed near the close of this disclosure. Thus, numerals in brackets ([1], [2], etc.) are intended to refer to references in that list.

As processor speeds continue to increase at a much higher exponential rate than DRAM speeds, memory latencies will soon exceed 1000 cycles. With such non-uniform access times, the flat memory model that was made practical by deeply pipelined superscalar processors with multi-level cache memories will no longer be tenable due to the inexorable effects of Amdahl's Law. The most common approach to this problem is hardware multi-threading, but multi-threading requires either abundant independent applications, or well-parallelized monolithic applications, and neither is easy to come by.

In U.S. Pat. No. 6,308,261 ("Computer System Having an Instruction for Probing Memory Latency"), as well as European Patent Nos. EP 0933698A2 ("Probing Computer Memory Latency") and EP 0933698A3 ("Probing Computer Memory Latency"), Dale C. Morris and Douglas B. Hunt have proposed to maintain availability status for registers in a computer system, wherein the availability status indicates whether an instruction attempting to read a particular register (which can be the destination of a memory load instruction) will stall. A memory probe instruction can be used to alter the program execution path based on the availability status of one or more of the registers. In one embodiment, a latency probe instruction retrieves the availability status of a register to another register so that a conditional branch instruction can determine the program execution path based on the availability status. In another embodiment, a conditional branch instruction can query the availability status of a register directly to determine the program execution path. Conceptually, the availability status is the same as the presence bit used in I-structures [1] or tagged memory.

A need has been recognized in connection with providing a more broadly applicable and more effective approach than in conventional arrangements such as those contemplated by Morris and Hunt and by others.

SUMMARY OF THE INVENTION

In accordance with at least one presently preferred embodiment of the present invention, there are broadly contemplated herein braids and fibers, high-level programming constructs which facilitate the creation of programs that are partially ordered. These partial orders can be used to respond adaptively to hardware latencies. It is shown how these constructs can be effectively supported with very simple and inexpensive instruction set and microarchitectural extensions. Braiding is much simpler than parallelizing, but yields many of the same benefits. Braided versions of a number of important algorithms, including quicksort the mark phase of a garbage collector, have been developed. The braided code is easy to understand at the source level, yet can be translated into highly efficient code using hardware extensions in accordance with the present invention.

In summary, one aspect of the invention provides computer instruction set architecture comprising: an inquiry instruction for making an inquiry of at least one characteristic of at least one operation; wherein at least one of the following is performed in connection with the operation: (a) the inquiry is made without the at least one operation being performed; (b) if the at least one characteristic satisfies at least one condition, the at least one operation is performed; yet if the at least one characteristic does not satisfy the at least one condition, the at least one operation is not performed and the at least one characteristic of the at least one operation is reported; (c) if the at least one characteristic satisfies at least one condition, the at least one operation is performed; yet if the at least one characteristic does not satisfy the at least one condition, the at least one operation is performed in an alternate mode that does not block subsequent operations from being executed; and (d) the inquiry is made after the at least one operation is performed.

A further aspect of the invention provides a computer system comprising a processor and a prediction mechanism; the prediction mechanism being adapted, upon receiving an inquiry from the processor, to provide an estimate of at least one characteristic of at least one operation without executing the at least one operation.

Yet another aspect of the present invention provides a process comprising the steps of: generating an address of an operand; inquiring as to whether the operand is available for reading or writing; performing one of the following: (a) if the operand is available, performing an operation immediately; (b) if the operand is not available, recording the operand in a data structure and issuing an operation intended to make the operand available after a predetermined time.

Furthermore, an additional aspect of the invention provides a process comprising the steps of: generating the address of an operand, performing one of the following (a) and (b): (a) employing a split-phase operation to attempt to read or write the operand; (b) determining whether a split-phase operation will succeed or fail; performing one of the following (c) or (d): (c) if a split-phase operation succeeds, or it is determined that a split-phase operation will succeed, repeating the generating step after performance of a split-phase operation; (d) if a split-phase operation fails, or it is determined that a split-phase operation will fail, recording in a data structure either an address or other information related to a split-phase operation; consulting a data structure to determine whether a deferred split-phase operation has completed; performing one of the following (e) or (f): (e) if a deferred split-phase operation has completed, extracting information from the consulted data structure and repeating the generating step; (f) if a deferred split-phase operation has not completed, either: waiting for a deferred split-phase operation to complete; or performing other operations until a deferred split-phase operation has completed and then repeating the generating step.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 depicts a sequential histogram calculation.

FIG. 2 depicts a histogram calculation with explicit work deferral.

FIG. 3 depicts a braided histogram calculation.

FIG. 4 depicts inquiring memory instructions.

FIG. 6 depicts split-phase prepare instructions.

FIG. 7 depicts memory transaction register instructions.

FIG. 8 depicts branch mnemonics.

FIG. 9 depicts a sequential garbage collector mark phase.

FIG. 10 depicts a garbage collector mark phase with explicit work deferral.

FIG. 11 depicts a braided garbage collector mark phase.

FIG. 12 depicts a braided sparse matrix-vector multiply algorithm.

FIG. 13 depicts a WHEN statement and its translation.

FIG. 14 depicts a complex WHEN statement and its translation.

DESCRIPTION OF THE PREFERRED EMBODIMENTS

Figure 5:
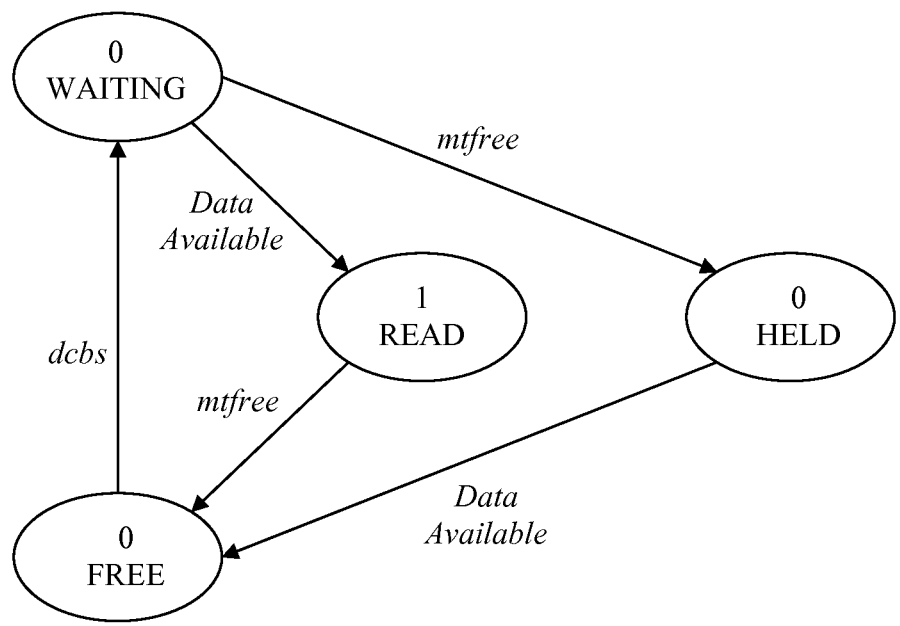
FIG. 5 schematically depicts state transitions for a memory transaction identifier.
Figure 15:
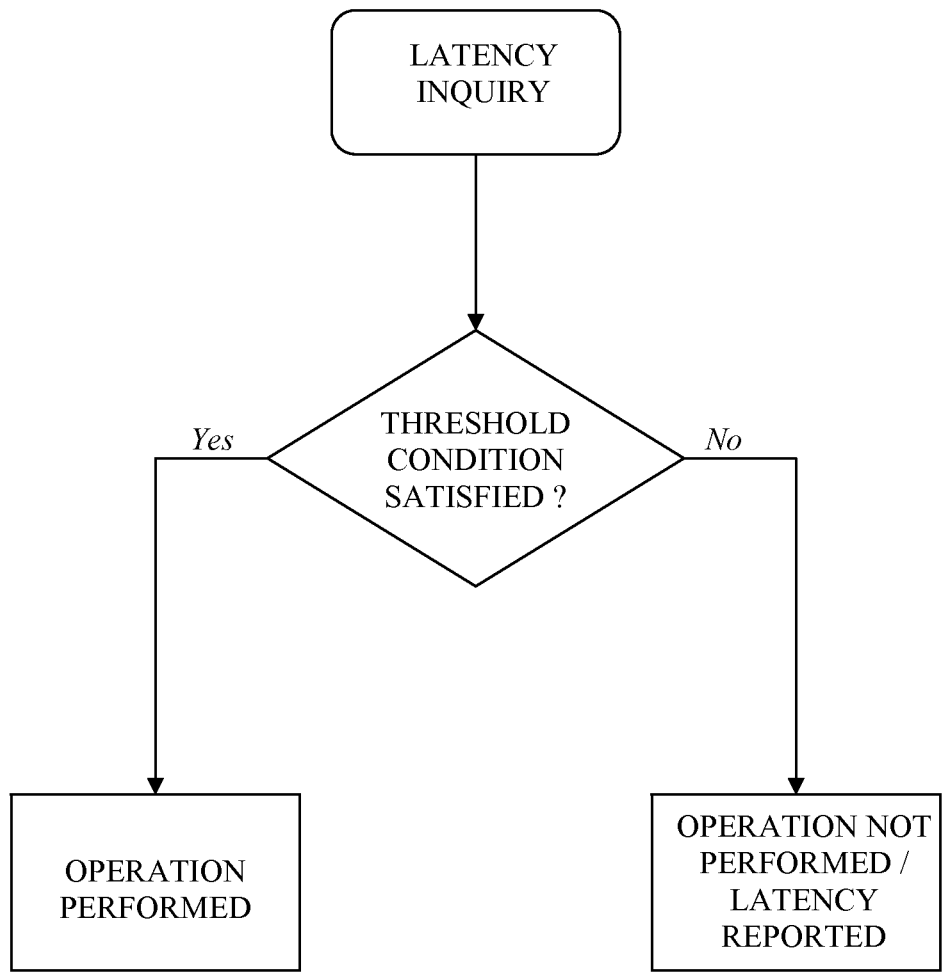
FIGS. 15-18 illustrate flowcharts depicting preferred features of the invention.
Figure 16:
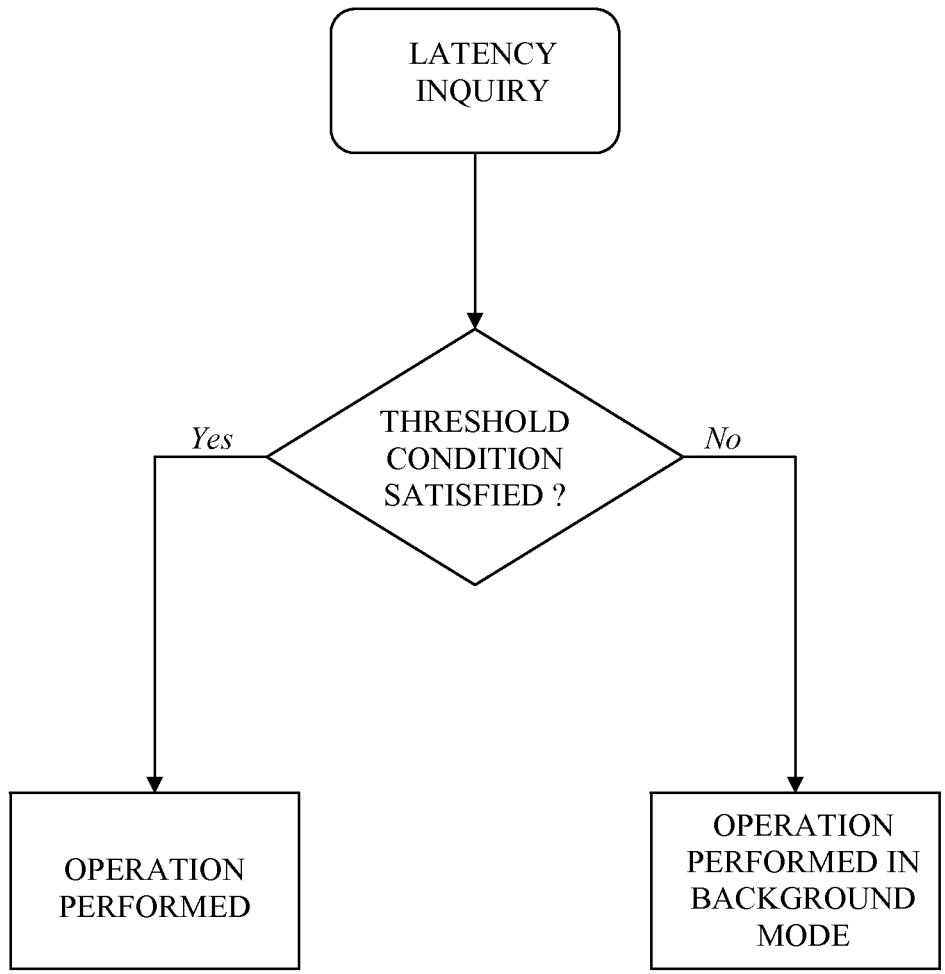
Figure 17:
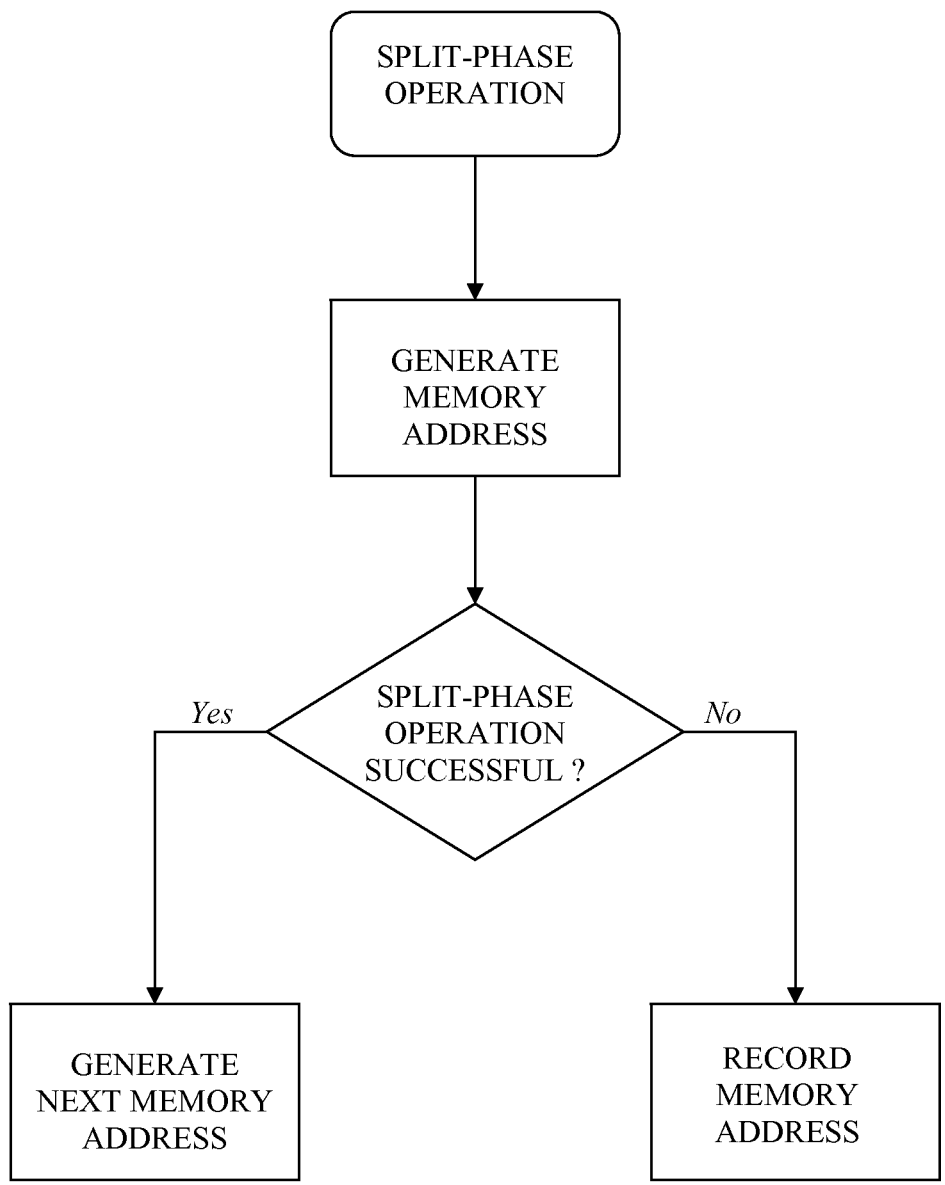
Figure 18:
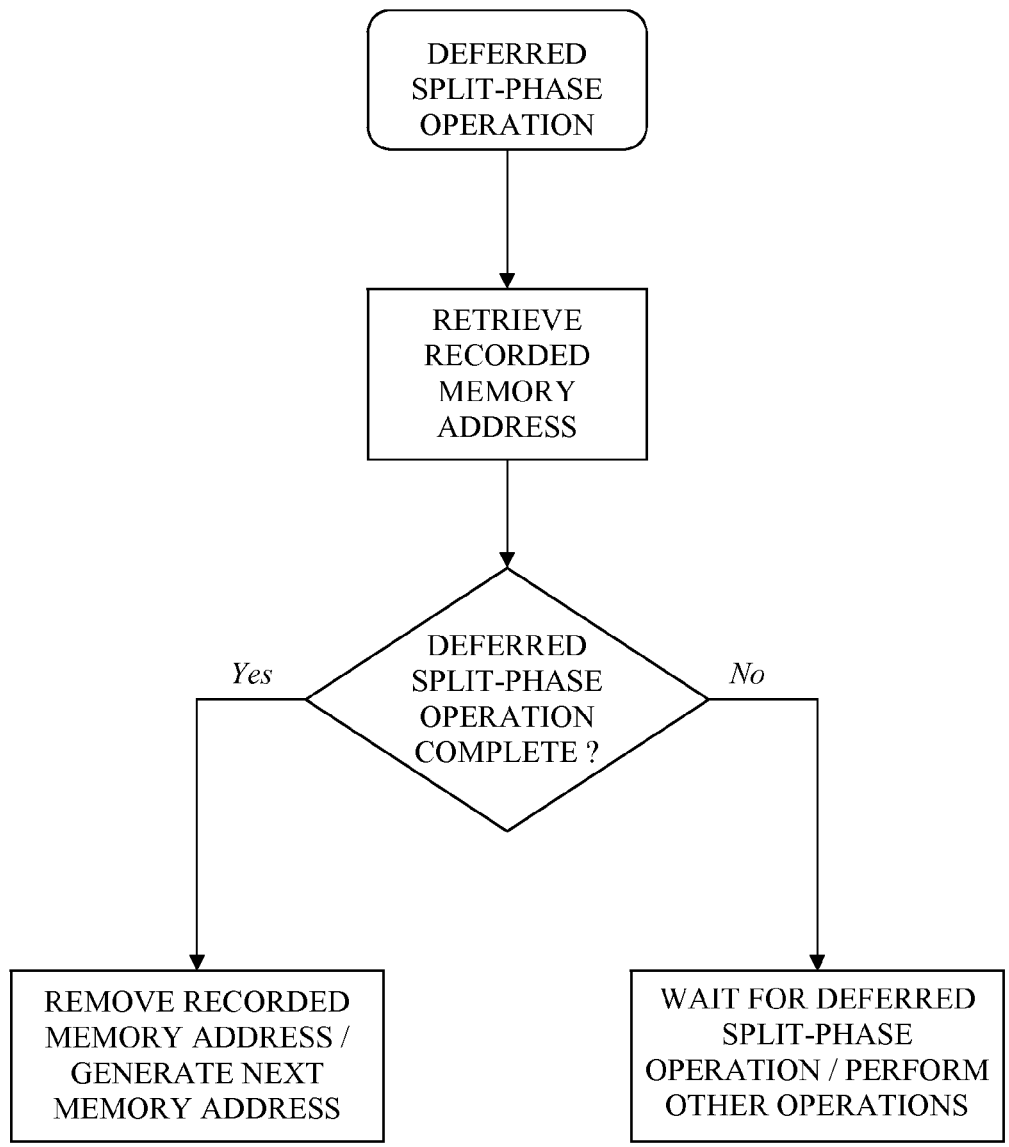

It should be appreciated herethroughout that the inventive constructs broadly contemplated herein are applicable both to hardware and software environments. Specific reference will be made to one environment or the other as needed. Otherwise, it may be assumed that both environments are contemplated (where appropriate).

Generally, there is broadly contemplated in accordance with at least one presently preferred embodiment of the present invention systems and arrangements considerably different from and more effective than those presented by Morris and Hunt. Particularly, for a memory load instruction, in Morris & Hunt's method, the load operation is always performed. In accordance with an embodiment of the present invention, however, the load operation may not be performed at all if the predicted latency is long (for example, the data is not cached in an on-chip cache).

For a memory load instruction that causes long latency, in Morris & Hunt's method, some status register is set properly once the data becomes available for use. In accordance with an embodiment of the present invention, however, it is possible that no status flag (observable to software) will be set when the data becomes available (in this case, the software can use the query instruction again to check to see if the data is available).

In Morris & Hunt's method, an availability status is associated with an architecture register. In accordance with an embodiment of the present invention, there is no such constraint. This provides enormous flexibility. For example, in accordance with an embodiment of the present invention, a query instruction can be used to check the latency of a memory barrier instruction (which does not write to any architecture register, but may experience very long latency).

In Morris & Hunt's method, an availability status indicates whether the data is available or not. With a cache miss, the software would not be able to tell how long it is likely to take before the data is available. In this case, only after the data becomes available will the software be notified (the software need to poll the availability status). In accordance with an embodiment of the present invention, however, a latency inquiry instruction can receive the expected latency of a memory load operation. For example, the latency prediction mechanism can tell the software if the data is on-chip or not within a short period of time (well before the data becomes available). It is worth noting that, even though the data is not available, a prediction of how long it will take to receive the data (e.g. whether the data is cached on-chip or not) can be very useful to software. In the case of short latency, it may be preferably for software not to jump to another task (especially in the presence of out-of-order execution).

High performance uni- and multi-processors have for many years been designed to present a flat memory abstraction to the programmer. This greatly simplifies the programming model, and works well as long as caches are able to hide memory system latency. However, this abstraction is beginning to break down due to current technological trends in which the memory hierarchy is becoming ever deeper while the relative speed of the processor to the memory continues to increase. Latencies for main memory accesses will soon exceed 1000 cycles.

Techniques like prefetching have been used successfully to hide significant amounts of latency, but prefetching only works well for highly predictable programs. Ultimately, as the performance of the memory system becomes more and more non-uniform, such approaches to tolerating latency will no longer function. One needs ways to adaptively avoid latency and do other work.

If one goes to a restaurant and there is a line, one is given an estimate of the length of time one will have to wait. If one calls a customer service and all their operators are busy, one receives an automatic estimate of the amount of time one will have to remain on hold. Explained in these practical, real-world contexts, it seems highly apparent that one ought to find out how long a variable, potentially lengthy delay will take. A high-level programming model that allows programs to respond to long latencies by performing other work while high-latency operations are in progress is now presented.

The fundamental approach is to divide the program into fibers, which are sections of sequential code that can be interleaved in a partial order. Although fibers are partially ordered with respect to each other, each individual fiber executes sequentially. This greatly reduces the conceptual complexity of the programming model, since the programmer must not worry about locking or arbitrary interleaving of parallel threads. Instead, the interleaving occurs at intuitive points that are specified and controlled by the programmer. A collection of fibers with the same scope of execution is called a braid. Braids are object-like abstractions, and fibers are method-like abstractions.

After presenting the high-level abstractions and an example algorithm that uses them, the extensions to the hardware and instruction set architecture that are required to support braided code will be presented. The fundamental hardware abstractions are inquiring operations and split-phase operations, which return information about potentially lengthy instructions instead of blocking and waiting for the result. They allow the program to respond adaptively and perform other work while waiting for the operation to complete (for instance, waiting for the loading of a memory location into the cache, or the computation of an address translation).

To allow efficient interaction between software and hardware resources, the hardware associates memory transaction identifiers with in-flight operations. The software can then poll for completion, typically when some other memory operation is deferred. A number of braided algorithms, and examples of the corresponding compiled code that makes use of our instruction set extensions, are presented herein.

The balance of the instant disclosure is organized as follows: the high-level-language constructs for expressing braided code are presented, the instruction set architecture (ISA) extensions are presented, how the ISA extensions can be implemented inexpensively at the micro-architectural level are presented, and a number of braided algorithms are presented. An Appendix (relating to FIGS. 13 and 14) presents the compiled code for a simple braided program. Finally, related work will be discussed.

Programming Constructs

A set of high-level language constructs for expressing latency-adaptable programs will now be described. In subsequent sections the necessary instruction set architecture (ISA) and micro-architecture enhancements to support these constructs will be described, and it will be shown how the constructs can be efficiently compiled to the extended ISA.

Fundamentally, a program that is able to adapt to memory latency must defer some portion of its work while necessary data is being fetched. To do this it must be able to operate on a partial order over its data. Therefore, the programmer must give up explicit control of the ordering of some operations in exchange for higher performance.

Explicit Programming for Availability

The fundamental primitive notion that allows programmers to express latency-dependent partial orders is that the program can inquire whether an object is in local memory before committing to perform some work on that object. The exact definition of "local memory" can be implementation-dependent, but the difference between "local" and "non-local" should be large. For instance, "local" might be on-chip L1 or L2 caches while "non-local" might be off-chip L3 cache or DRAM memory.

Statements that query for memory locality are called inquiring operations. There are two inquiry operators, which take an expression and return true if it is possible to read or update the expression (typically something like a C lvalue) "now"—that is, with minimal delay.

The syntax of these unary boolean operators is

| readnow expr |
| updatenow exp |

They are typically used in conditional statements, for instance

| if (readnow a[i]) |
|     process(a[i]); |
| else |
|     enqueue(a[i]); |

The want statement (presented for completeness, and not part of the present invention) is a declaration that the program intends to use a memory location in the near future; it is essentially a prefetching declaration.

To see how the inquiry and prefetch operators can be used to program explicitly latency-adaptive computations, consider the simple example of histogram calculation, as shown in FIG. 1. This function iterates over an array of values, and for each value increments an associated "bucket" in the histogram array. The iteration over the array of values is sequential, and memory latencies may be avoided by the hardware caching and prefetching mechanisms. However, the updates to the histogram array could be completely random. If the histogram array is too large for the cache, the program will suffer a cache miss on a very high percentage of the histogram updates. If the penalty for a miss is large, the slowdown will be dramatic.

FIG. 2 shows how many of the cache misses can be avoided using explicitly programmed inquiring operations. Before updating the histogram array, the function uses the update-now operator to check whether the target location can be written without delay. If so, the update is performed as before. Otherwise, the target index is stored in a queue and the want statement is used to prefetch the target array element. When the queue is full, it is drained and then the iteration continues.

With the appropriate tuning of the queue size, most accesses will hit in the cache. However, tuning the queue size is tricky: if it is too small, the function will try to update the queued histogram elements before they have been prefetched. If it is too large, the prefetched elements will already have been evicted again by the time they are processed.

Programming with Braids and Fibers

While explicit use of inquiring operations, as illustrated above, is sometimes useful, the need for the user to tune the queue size also illustrates a potential weakness of the approach. Therefore, it is desirable for the system (including the hardware, the compiler, and the run-time system) to manage the work queue of outstanding work implicitly.

In order to do this, the program must be broken up into units that can execute out-of-order. We call these units fibers, since they behave somewhat like very fine-grained threads. The fundamental abstraction over fibers is the braid. Intuitively, with our braid construct, one can think of the fibers as being attached at the beginning and end of the braid, but freely intertwined between the two ends.

The major difference between braiding and other fine-grained multi-threading abstractions is that at execution time there is a well-defined total order of high-level operations. Programmers therefore do not need to concern themselves with the complexities of concurrency and synchronization, but only with specifying a relaxed ordering in which the high-level functions of the program can occur.

Furthermore, since all of its component fibers must terminate for a braid to terminate, braids provide abstraction over concurrency: two successive braids can be viewed as completely sequential at the macro level. Any internal concurrency in either braid will never have any effect on the operation of the other braid.

A braid is declared as a special type of class, and a fiber is declared as a special type of method.

A braid defines a set of braid instance variables. Inside of a braid, the only variables accessible are the braid instance variables, local variables, and formal parameters of methods. The braid class may define static variables, but they must be constants (for instance, final pointers to mutable objects are not allowed). A braid's instance variables are not accessible outside of the braid. This includes other braids of the same class; therefore, the instance variables are not private in the Java sense of the term.

Braids are scoped and block-structured: they are created with the braid statement, which creates a braid object and executes the associated fibers with the braid; braids may not be created with the new operator. The braid statement terminates when the main control fiber all deferred fibers of that braid have terminated. Braid objects can be passed as parameters and stored in other objects, but once terminated any attempt to invoke a braid method will raise a BraidTerminated exception.

It is easiest to explain braids in the context of an example. FIG. 3 shows a braided version of the histogram calculation. The histogram calculation is encapsulated in a braid class named Histogram. It has a normal constructor, which takes the value and histogram arrays as parameters, but it runs in the context of its own braid, so it may spawn fibers.

The fiber method UPDATE( ) takes two parameters: an integer lvalue and an integer index. Since lvalue is a update parameter, the fiber is only executed if the parameter satisfies the updatenow predicate. Since index is a use parameter, its value is made available inside the fiber. Note that since lvalue is not declared as use update, it is actually not in scope inside of the fiber. By convention, fiber names are all upper case to emphasize fiber calls.

Fibers are coroutine scheduled: a fiber either runs immediately if all of its read and update parameters are available, or it is deferred. If a fiber is deferred, other previously deferred fibers may run. Thus any fiber within the braid may run at any fiber call point, or at the end of the braid, but nowhere else. Furthermore, fibers execute atomically until they terminate or until they make another fiber call. Semantically, each fiber runs with its own stack. Elimination of separate stack, store of return address, and inlining are all optimizations of the basic model.

The braid statement in the computeHistogram( ) method (which is part of some other class) creates a braid scope, instantiates the braid class object of type Histogram within that scope, and executes its constructor. The Histogram object is not bound to any variable since there are not any meaningful operations that can be performed on it once it terminates. However, within the braid the object can be referred to normally using the this reference, which can be stored in stack or heap variables of arbitrary lifetimes.

Programmers should attempt to use as few use parameters to fiber methods as possible. Values that are constant during the execution of the braid should be stored in final braid instance variables, and when it does not involve extra computation on the fast (non-deferring) execution path, multiple objects should be consolidated. For instance instead of passing three variables in this braided hash table insertion:

```
int i = hash(key);
INSERT(table[i], key, value);
.
.
.
INSERT (update Nod Head, Key key, Val val) {
    Nod n = new Nod(key, val)
    n.nxt = head;
    head = n;
}
```

It is more efficient to pass a single Nod object that contains both the key and value pointers, since this operation is performed anyway if the INSERT( ) method is executed immediately:

```
int i = hash(key);
Nod n = new No
INSERT(table[i], n);
.
.
.
INSERT (update Nod Head, Nod nod) {
    n.nxt = head;
    head = n;
}
```

Using these types of optimizations, the histogram example can easily be optimized to run with only a single word of stored state per deferred fiber.

The break braid statement can be used to terminate the current braid block and abort any pending fibers. Note that since fibers execute sequentially, there is no danger of a break statement asynchronously interrupting a running fiber—the only fiber that it interrupts is the one which itself issues the break braid statement.

Instruction Set Architecture

In this section the extensions to the instruction set architecture to support the approach of the present invention is described. To make the design concrete, the ISA is presented as an extension to the 64-bit IBM POWERPC [10] architecture, but the same principles can be applied to any modern instruction set architecture.

As with all instructions that address memory, the issue of which addressing modes to support is an issue with our memory instructions. This issue is abstracted by simply presenting instructions that take an address as a parameter. There could be as few as one addressing mode per instruction or as many as are supported by all the various load/store instructions in the machine ISA. Which addressing modes to support is primarily a tradeoff between orthogonality and instruction set encoding space.

Inquiring Memory Operations

An inquiring memory operation is one that finds out whether a given address can be accessed in a timely fashion. This is in contrast to the informing memory operations of Horowitz et al. [3], which inform the program how long a memory operation has taken once it completes. An inquiring memory operation returns some state information about the memory location in question, which can subsequently be used for conditional execution of loads and stores.

The POWERPC instruction set [6] already contains prefetch instructions, called Data Cache Block Touch (dcbt) and Data Cache Block Touch for Store (dcbtst). These instructions generate speculative loads of the cache line containing the effective address of the instruction. We will model our instruction set extensions as further "data cache block" operations.

In keeping with POWERPC architecture conventions, a condition register (CR7) is assigned to hold the outcome of inquiring memory operations. An alternative implementation would be to have a completely separate set of memory query condition registers. Separating the memory query results may be beneficial for branch prediction, which may be more accurate if memory-dependent branches are treated differently.

Since the condition register is four bits wide, the following meanings can be assigned to the condition register fields:

Available (EQ). Indicates that the data at the memory address requested is available for load or store. The meaning of "available" is implementation-defined. In general, data is available if it can be supplied to the CPU without a large latency. The most common cause of unavailability is a cache miss, but any source of latency can be considered, for instance a TLB miss or other address translation delay.

Time1, Time2 (LT,GT). These two bits together provide a two-bit value which estimates the total latency of the memory operation. The interpretation of the four values is implementation-defined, but roughly corresponds to an L1 hit (00), L2 hit (01), L3 hit (10), and main memory/remote CPU access (11).

Overflow (SO). For split-phase memory operations (see Section 3.2), indicates that hardware resources to initiate the split-phase operation are unavailable. Set to 0 by all other inquiring memory operations.

Obviously, there are many levels of detail at which latency information could be provided, from a single bit ("available" or "not available") to a number estimating the number of cycles required. Herein we present a preferred embodiment making use of the POWERPC's condition register architecture.

The simplest inquiring instruction simply asks whether the data at the given address is available. There are two variants: one for reading and one for writing. The latter is primarily for multiprocessor systems, where the operation of the cache-coherence protocol may delay a write. Query operations which return "available" may optionally prefetch the data into the L1 cache or pipeline the data to the CPU.

In the simplest incarnation of inquiring memory operations, only two instructions need to be added to the ISA (dcbq and dcbqst with one addressing mode each). These are shown in FIG. 4. The dcbq instruction performs a data cache block query: that is, it determines what the cost of accessing the data cache block containing the effective address is likely to be. The dcbqst does the same for a write rather than a read operation. Generalizations include multiple addressing modes and combined query/load instructions that perform the load operation if the data is available.

Split-Phase Memory Operations

Split-phase memory operations allow the software to initiate a load or store and be notified semi-asynchronously when the resources are available to perform it. The notification is semi-asynchronous because the hardware asynchronously sets a flag indicating that the data is available, but the software must poll for this condition.

To support split-phase memory operations, the hardware maintains a memory transaction register (MTR), which is assumed to be the same size as the architected register size, in the present case 64 bits. Each bit in the MTR may be associated with a split-phase memory operation, and if so associated, indicates whether or not the memory is available (1) or not available (0).

The MTR may be read by the program but may not be written directly. Instead, split-phase memory operations on data that is not immediately available are associated with a particular memory transaction identifier (returned in a general purpose register). When the data becomes available, the bit indexed in the MTR by the returned GPR value is set.

The MTR can be examined by the program. Memory transaction identifiers must also be freed explicitly by the program, but may not be immediately usable depending on the hardware implementation (in particular, if a transaction identifier is freed while a memory transaction is in progress, the hardware may not make the freed MTR transaction identifier usable until the transaction completes).

FIG. 5 shows the state transitions associated with split-phase operations. The normal sequence of states is Free-Waiting-Ready-Free. However, if a transaction identifier is freed before the memory operation completes the Held state may be entered for some period of time (typically until the outstanding memory operation completes).

The dcbp (Data Cache Block Prepare) and dcbpst (Data Cache Block Prepare for Store) instructions begin split-phase memory operations. If the data is already available, they act like their corresponding query operations. However, when the data is not available the hardware allocates a memory transaction identifier, which is an index into a bit in the MT R. This bit will eventually be set to 1 when the data becomes available. The program can therefore save a small amount of state indexed by the transaction identifier number and periodically poll for completion. When the operation completes, it can branch to a handler and use the saved state to perform a deferred operation.

The dcbpst instruction is almost identical, except that the prepares for a store operation. This causes the cache line containing [addr] to be obtained in exclusive mode instead of shared mode. On a uniprocessor, dcbpst has the same functionality as dcbp.

The POWERPC architecture defines a variety of special-purpose registers (SPRs), and instructions to read and write these registers. The memory transaction register (MT R) can only be read; it may not be written directly, although there can be instructions which modify its state indirectly.

The Move From Memory Transaction Register instruction loads a copy of the current state of the MTR into a general purpose register, as shown in FIG. 7(a). Once the contents of the MTR are in a general purpose register, standard ALU instructions are used to determine the course of action. Common cases are comparing the MTR contents to 0 to determine whether any data has become available, and using the count leading zeros (CLZ) instruction to get the index of the first memory operation which has become available.

Once a split-phase memory operation has been completed, the associated transaction identifier should be freed for re-use by subsequent split-phase operations. There are two forms: the mtrfree instruction releases a single memory transaction identifier named by a GPR, as shown in FIG. 7(b).

The mtrclr instruction shown in FIG. 7(c) releases all memory transaction identifiers and may be used at context switches when software is not prepared to handle transaction identifiers generated by other contexts. In this case it is the software's responsibility to either complete or re-initiate the split-phase operations when the context resumes execution.

There may be some delay between the freeing of a transaction identifier by software and its availability for re-use, especially if the transaction identifier is freed before the corresponding memory operation is complete.

In the event that multiple methods, threads, or processes are simultaneously issuing split-phase operations, it may be helpful for the application to determine how many split-phase operations can be issued before there are no more available transaction identifiers. If this is the case, the number of available transaction identifiers can be obtained by loading the MTR into a general purpose register and then counting the number of 0 bits in the register with the Count Zero Bits (cntzb) instruction shown in FIG. 7(d).

A set of new instruction mnemonics can be added for branch instructions based on the outcome of inquiring memory operations. These assembler mnemonics are shown in FIG. 8.

Microarchitecture Support

The implementation of the instruction set extensions at the micro-architectural level in accordance with the present invention will now be described. To make the design complete, it is described in terms of the micro-architecture of the IBM POWER4 chip [11], since it represents an aggressive design for which documentation is widely available. Clearly the design of the present invention is predicated on delay characteristics of future processor generations, but it is expected the implementation to remain largely the same.

At the micro-architectural level, the inquiring instructions (dcbq and dcbqst), split-phase prepare instructions (dcbp and dcbpst), and memory transaction register instructions (mtrfree and mtrclr) primarily interact with the Load Miss Queue or LMQ. In general, the hardware is free to take advantage of the fact that these operations are designed to improve performance, so a certain amount of imprecision may be tolerated (although this should not be abused, as it will otherwise negate the effect of the optimizations). Thus the inquiry operations that set the EQ (memory available) bit and the LT,GT (memory delay) bit pair in the condition register are to some extent free to return arbitrary results. However, the hardware should err on the side of conservatism: it is better to report that a few in-cache data are not in cache, which will lead to spurious delay of work, than to report that out-of-cache data are in cache, which will lead to processor stalls.

Similarly, since bits in the MTR are set asynchronously by the hardware, the state of the MTR as observed by the program may be out-of-date with respect to completed transactions (but not with respect to freed transactions). This fact may be exploited by the implementation to avoid branch mis-predictions based on the MTR value by eagerly executing the mfmtr instruction. The only absolute restriction is that available data must eventually be detected by the program, but in practice it should be detected as soon as possible.

The number of memory transaction identifiers is implementation-dependent, anywhere from 0 to 64. It will generally be less than the number of LMQ entries.

Supplying Memory Latency Information

A cache directory may be placed physically closer to the processor than the corresponding cache data array. This allows directory information to be accessed faster to reduce the overhead of latency inquiry operations. For example, the processor chip may contain the directory of the L3 cache, but not the data array of the L3 cache.

In addition, cache latencies need not be distinguished if the difference is small. Consider a computer system that employs on-chip L1 and L2 caches and off-chip L3 cache. Since the difference between on-chip and off-chip access latencies is much more than the difference between on-chip access latencies, we can treat L1 and L2 caches in the same way when a latency inquiry operation is performed. In particular, we may choose to report as "available" (EQ bit on) data that is in either L1 or L2 cache.

The cache state can be used to determine or predict the latency of memory access operations. For example, for a store operation, we can predict its latency based on where the address is cached, and in what state the data is cached. If the cache state shows the address is cached with the exclusive ownership, a store operation can be executed on the cache with little cache coherence overhead. In contrast, if the cache state shows that the address is cached without the exclusive ownership, a store operation may not be executed before other cache copies are invalidated. The latency of a store operation is generally more important for strict memory models such as Sequential Consistency than for relaxed memory models such as POWERPC's memory model.

If the desired address is in L1 cache it is immediately reported as available (EQ=1) with a latency of "very short" (LT,GT=00). If the L2 cache is on-chip, the inquiry operation is treated similarly to a load: it generates a specially tagged entry in the load miss queue (LMQ).

For inquiry operations (dcbq and dcbqst) the operation completes as soon as the L2 directory lookup has been performed. If the line is in the L2 cache, a prefetch to L1 cache is initiated, the line is reported as available, and the latency is reported as "short" (LT,GT=01). Otherwise, a prefetch is not initiated and the latency is reported as either "long" or "very long" (LT,GT=10 or 11). On an L2 hit, the LMQ entry is released when the prefetch completes; on an L2 miss the LMQ entry is released immediately. Note that when a load or store is issued subsequent to a corresponding cache query instruction, the load can be combined with the query in the LMQ.

Alternatively, the computer system can have a built-in prediction mechanism that can be used to predict whether an address is loaded in a cache or set of caches. The prediction mechanism is often based on a prediction table that is smaller than the cache directory and can therefore be accessed faster than the cache directory. For example, the prediction table could be a summary of the cache directory that contains only a subset of the address bits, or a hashed value from the address bits. When an address is loaded into the cache, a corresponding entry is created in the prediction table. The prediction table can be a set-associative table that uses an LRU replacement algorithm. For a latency inquiry operation, if the address is found in the prediction table, the latency is predicted to be the cache hit latency; otherwise the latency is predicted to be the cache miss latency.

Split-Phase Operations and the MTR

The split-phase prepare instructions (dcbp and dcbpst) are implemented similarly to the inquiry instructions, but with more sophisticated functionality. They always cause a speculative load of the cache line containing the effective address into the L1 cache. Therefore the corresponding LMQ entry is not released until the cache load is completed (although the instruction is retired as soon as the inquiry portion completes and MTR resources have been allocated).

If the cache line is not "available", a split-phase operation is initiated and the hardware searches for an available transaction identifier. This is done by looking for a zero bit in a non-architected register that records reserved MTID's (the Memory Transaction Reservation Register or MTRR).

If the MTRR is all ones (indicating no transactions available), the SO bit is set to 1, indicating an MTR overflow, and the instruction completes. The associated cache load operation can optionally be flushed. This is not required, but is perhaps best done asynchronously to avoid flooding the LMQ in pathological cases.

If there are transactions available, the search begins with the bit specified in the non-architected Memory Transaction Search Register (MTSR). The MTSR is rotated to the left (modulo the number of available transactions) until a free bit is found in the MTRR.

Assuming there is a free bit in the MTRR, that bit position is assigned as the memory transaction identifier (MTID) of the request, and is return in register Rn. The MTID is associated with the LMQ entry, and that bit position is set to 1 in the MTRR and 0 in the MTR.

When a cache load completes, the cache logic looks for an MTID associated with the completed LMQ entry. If present, that bit is set to 1 in the MTR. Then the LMQ entry is released. Note that the update of the MTR bit may be performed asynchronously without any particular timing constraint, and the bit need not be set before the LMQ entry is released.

Memory Transaction Register Instructions

The corresponding pair of bits in the MTR and the MTRR determine the four states in the state transition diagram for MTIDs (FIG. 5). In fact, the value reported for the MTR by the mfmtr instruction is really the value of MTR^MTRR.

The mtfree instruction releases an MTID. The MTID may, however, not be available for immediate re-use if the MTID is associated with an LMQ entry. The implementation of mtfree is simply to negate the associated bits in the MTR and MTRR, which has the effect of moving a READY transaction into the FREE state, while a WAITING transaction is moved into the HELD state.

The mtclr operation simply negates the entire MTR and MTRR registers.

Methods and Algorithms

The concept of braids and fibers, high-level programming constructs supported by split-phase operations herein described, have been illustrated with the example of a histogram calculation. We now show how the present invention can be applied to more complex algorithms.

Garbage Collector Mark Phase

The mark phase of a garbage collector is essentially a graph traversal algorithm. It traverses the object graph, marking all objects that it encounters as live. It is therefore very memory intensive as well as containing many unpredictable, non-local memory accesses.

The standard formulation of the mark phase [7, 5] is shown in FIG. 9. The markStack is initially the set of roots (pointers in registers and on the stack). The method or algorithm then recursively traverses the object graph, marking each new object it encounters and backtracking when it encounters a marked object.

The version using inquiring operations is shown in FIG. 10. In this example, markObject (X) is only called if x is in local memory. Otherwise, x is prefetched placed in the deferredQ. When the queue fills up, its elements are processed with markDeferred( ), which marks objects unconditionally to avoid repeated attempts to prefetch the same object, since that could cause cache pollution.

A braided version of the algorithm is shown in FIG. 11. In this case, the queue of outstanding memory operations is maintained in concert by the software and hardware. The fiber method causes the read parameter to be accessed using a split-phase operation dcbp. If the parameter is not available, it is queued and execution continues with another pointer in the mark stack. At some later point when another operation is not available, the software will poll the memory transaction register (MTR) and eventually receive notification that the earlier addressed memory location is now available, and will perform the delayed mark operation.

Sparse Matrix Algorithms

FIG. 12 shows how braids and fibers can be used to implement a sparse matrix-vector multiply operation. Each product operation is executed in a fiber, so that when a memory operation would stall another row is consulted for concurrent work. Therefore the software switches to another row when it can not proceed with the current row due to unavailability of an operand.

Related Work

Horowitz et al. [3] describes informing memory operations. While similar in spirit to inquiring memory operations of the present invention, informing memory operations provide feedback about memory performance to the program after the fact. They are therefore useful for profile-based approaches, but lack the ability to adapt dynamically in the manner of our inquiring operations, and they also lack the mechanism for associating operations with transaction identifiers.

Mowry and Ramkissoon [9] describe how informing memory operations may be used for compiler-controlled multi-threading on a processor core with simultaneous multi-threading (SMT). However, the programming model is significantly more complex since the programmer must be prepared to deal with arbitrary interleaving. The advantage of braiding over multi-threading is that the points at which fibers are interleaved are limited, well-defined, and apparent to the programmer.

Morris and Hunt [8] describe a computer system with instructions that allow registers to be probed to determine if an attempt to use them will stall. This approach is significantly less flexible than ours, since the ability to schedule arbitrary code at arbitrary times is greatly restricted by having to use fixed registers. The ability of our system to allocate and free transaction identifiers gives the software many more degrees of freedom.

There are also some superficial similarities with the Intel IA-64 NAT bits [4].

Split-C [2] provides split-phase memory operations (get and put) in a parallel, SPMD programming language. However, because the split-phase operations are assumed to have high overhead and there is no automatic notification of completion, the programmer must explicitly synchronize at various points, waiting for all outstanding split-phase operations to complete. Our hardware support makes the individual operations much lighter weight, which in turn allows synchronization at the level of individual split-phase operations.

I-structures [1] provide a split-phase functional abstraction in the form of a an array of write-once elements, and an array element read operation which blocks until the write has occurred. This is fundamentally different from our approach in that the semantics are based on the availability of the value, rather than the memory location.

Summary

Braids and fibers, high level programming constructs which allow a program to be expressed as sections of sequential code that can be interleaved in a partial order have been presented. Although fibers are partially ordered with respect to each other, they execute sequentially. This greatly reduces the conceptual complexity of the programming model, since the programmer must not worry about locking or arbitrary interleaving of parallel threads. Instead, the interleaving occurs at intuitive points that are specified and controlled by the programmer.

It has also been demonstrated how braids and fibers can be supported by simple extensions to existing instruct set architecture and microarchitecture. The fundamental hardware abstractions are inquiring operations, which return information about potentially lengthy instructions instead of blocking and waiting for the result. They allow the program to respond adaptively and perform other work while waiting for the operation to complete (for instance, loading a memory location into the cache, or computing an address translation).

To allow efficient interaction between software and hardware resources, the hardware associates memory transaction identifiers with in-flight operations. The software can then poll for completion, typically when some other memory operation is deferred. A number of braided algorithms have been presented, and examples of the corresponding compiled code that makes use of the instruction set extensions of the present invention have also been presented.

Contemplations

By way of general overview, there is broadly contemplated in accordance with an embodiment of the present invention an instruction, in a computer instruction set architecture or in software, for making inquiry of the latency or predicted latency of an operation (or set of operations) without actually performing the operation (or set of operations). The operation can be a memory load operation, memory store operation, memory read-modify-write operation, memory barrier operation, cache operation, synchronization operation, IO operation, arithmetic operation, branch/jump operation, address translation operation, or any architecture or software operation. There is broadly contemplated herein a set of registers for recording the latency or predicted latency of the operation (or set of operations) upon execution of the instruction.

There is broadly contemplated herein, in a computer instruction set architecture or in software, an instruction for making inquiry of the cost or predicted cost of an operation (or set of operations) without actually performing the operation (or set of operations). The cost may be based on at least one of: latency, bandwidth, power, reliability, security, efficiency or any other architecture or software metric. The operation may be a memory load operation, memory store operation, memory read-modify-write operation, memory barrier operation, cache operation, synchronization operation, IO operation, inter-processor communication operation, arithmetic operation, branch/jump operation, address translation operation, or any architecture or software operation. There may be a set of registers for recording the cost or predicted cost of the operation (or set of operations) upon execution of the instruction.

There is broadly contemplated, in accordance with an embodiment of the present invention, in a computer instruction set architecture or in software, an instruction for making an inquiry of the latency or predicted latency of an operation (or set of operations), wherein if the latency or predicted latency is below a threshold, the operation (or set of operations) is performed; if the latency or predicted latency if above the threshold, the operation (or set of operations) is not performed, and the latency or predicted latency of the operation (or set of operations) is reported. The operation may be a memory load operation, memory store operation, memory read-modify-write operation, memory barrier operation, cache operation, synchronization operation, IO operation, inter-processor communication operation, arithmetic operation, branch/jump operation, address translation operation, or any architecture or software operation. The threshold may preferably be specified in the instruction, in a separate instruction, or in the architecture or in software. There is broadly contemplated a set of registers for recording the latency or predicted latency of the operation (or set of operations) upon execution of the instruction.

There is broadly contemplated herein, in a computer instruction set architecture or in software, an instruction for making inquiry of the cost or predicted cost of an operation (or set of operations), wherein if the cost of predicted cost is below a threshold, the operation (or set of operations) is performed; if the cost or predicted cost is above the threshold, the operation (or set of operations) is not performed, and the cost or predicted cost of the operation (or set of operations) is reported. The cost is preferably based on at least one of latency, bandwidth, power, reliability, security, efficiency, or any other architecture or software metric. The operation is preferably a memory load operation, memory store operation, memory read-modify-write operation, memory barrier operation, cache operation, synchronization operation, IO operation, inter-processor communication operation, arithmetic operation, branch/jump operation, address translation operation, or any architecture or software operation. The threshold is preferably specified in the instruction, in a separate instruction, or in the architecture or software. There is preferably provided a set of registers for recording the cost or predicted cost of the operation (or set of operations) upon the execution of the instruction.

There is broadly contemplated herein, in a computer instruction set architecture or in software, an instruction for making inquiry of the latency or predicted latency of an operation (or set of operations), wherein if the latency or predicted latency is below a threshold, the operation (or set of operations) is performed; if the latency or predicted latency is above the threshold, the operation (or set of operations) is performed in the background mode that does not block subsequent instructions from being executed. The operation may preferably be a memory load operation, memory store operation, memory read-modify-write operation, memory barrier operation, cache operation, synchronization operation, IO operation, inter-processor communication operation, arithmetic operation, branch/jump operation, address translation operation, or any architecture or software operation. The threshold is preferably specified in the instruction, in a separate instruction, or in the architecture or software. The completion of the background operation is also preferably reported. A task specified in the instruction, if any, is preferably executed or scheduled to execute upon the completion of the background operation. A set of registers is preferably provided for recording the latency or predicted latency of the operation (or set of operations) upon the execution of the instruction.

There is broadly contemplated herein, in a instruction set architecture or in software, an instruction for making inquiry of the cost or predicted cost of an operation (or set of operations), wherein if the cost or predicted cost is below a threshold, the operation (or set of operations) is performed; if the cost or predicted cost is above the threshold, the operation (or set of operations) is performed in the in low-cost mode that does not block subsequent instructions from being executed. The cost may preferably be based on at least one of latency, bandwidth, power, reliability, security, efficiency, or any other architecture or software metric. The operation is preferably a memory load operation, memory store operation, memory read-modify-write operation, memory barrier operation, cache operation, synchronization operation, IO operation, inter-processor communication operation, arithmetic operation, branch/jump operation, address translation operation, or any architecture or software operation. The threshold is preferably specified in the instruction, in a separate instruction, or in the architecture or in software. Preferably, the completion of the low-cost operation is reported. A task specified in the instruction, if any, is preferably executed or scheduled to execute upon the completion of the low-cost operation. There is preferably provided a set of registers for recording the cost or predicted cost of the operation (or set of operations) upon the execution of the instruction.

There is broadly contemplated herein, in a computer instruction set architecture or in software, an instruction for making an inquiry of the latency or estimated latency of an operation (or set of operations) after the operation (or set of operations) is performed. Preferably, the operation may be a memory load operation, memory store operation, memory read-modify-write operation, memory barrier operation, cache operation, synchronization operation, IO operation, inter-processor communication operation, arithmetic operation, branch/jump operation, address translation operation, or any architecture or software operation. There is preferably provided a set of registers for recording the latency or estimated latency of the operation (or set of operations) upon the execution of the instruction.

There is broadly contemplated herein, in a computer instruction set architecture or in software, an instruction for making an inquiry of the cost or estimated cost of an operation (or set of operations) after the operation (or set of operations)

is performed. The cost is preferably based on at least one of latency, bandwidth, power, reliability, security, efficiency, or any other architecture or software metric. Preferably, the operation is a memory load operation, memory store operation, memory read-modify-write operation, memory barrier operation, cache operation, synchronization operation, IO operation, inter-processor communication operation, arithmetic operation, branch/jump operation, address translation operation, or any architecture or software operation. There is preferably provided a set of registers for recording the cost or estimated cost of the operation (or set of operations) upon the execution of the instruction.

Figure 19:
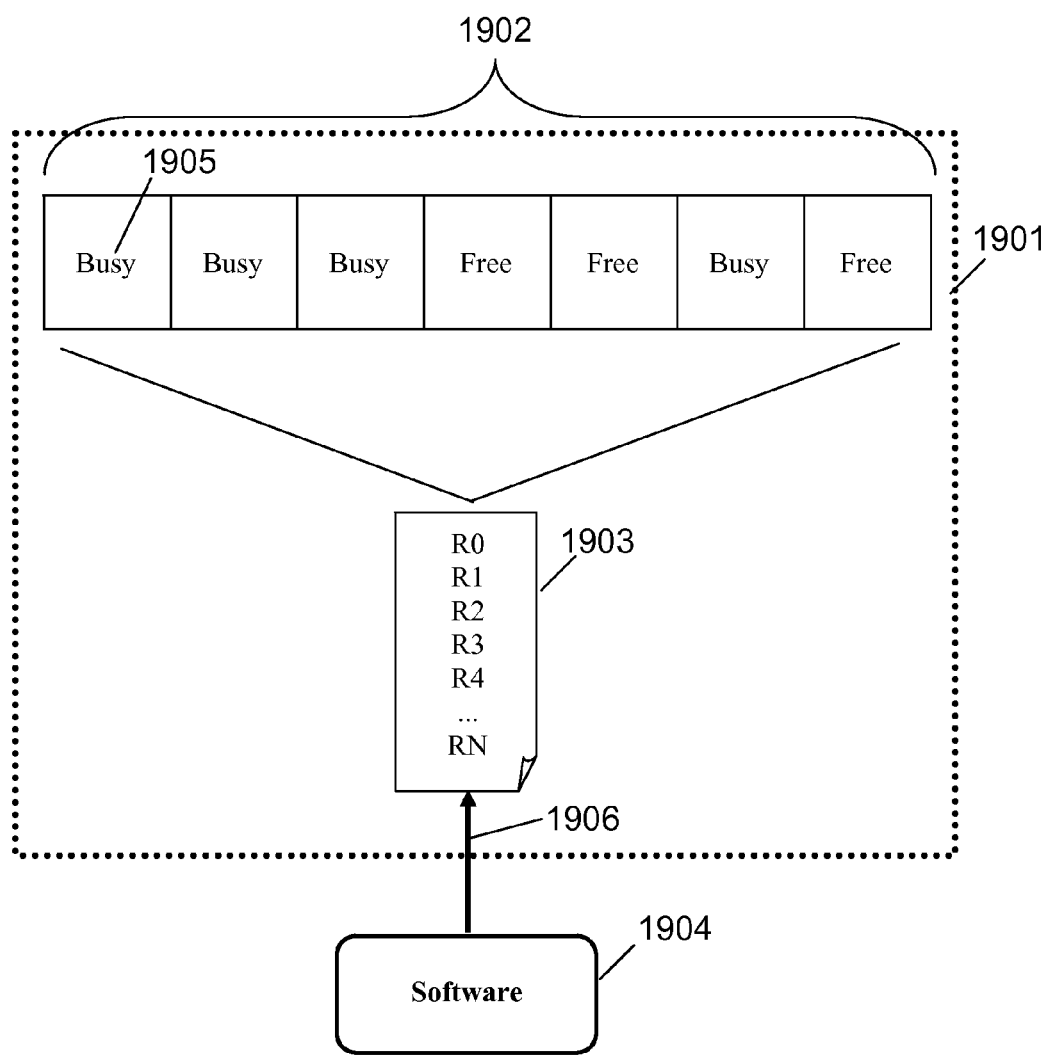
FIG. 19 depicts an example embodiment of system-managed registers.
Figure 20:
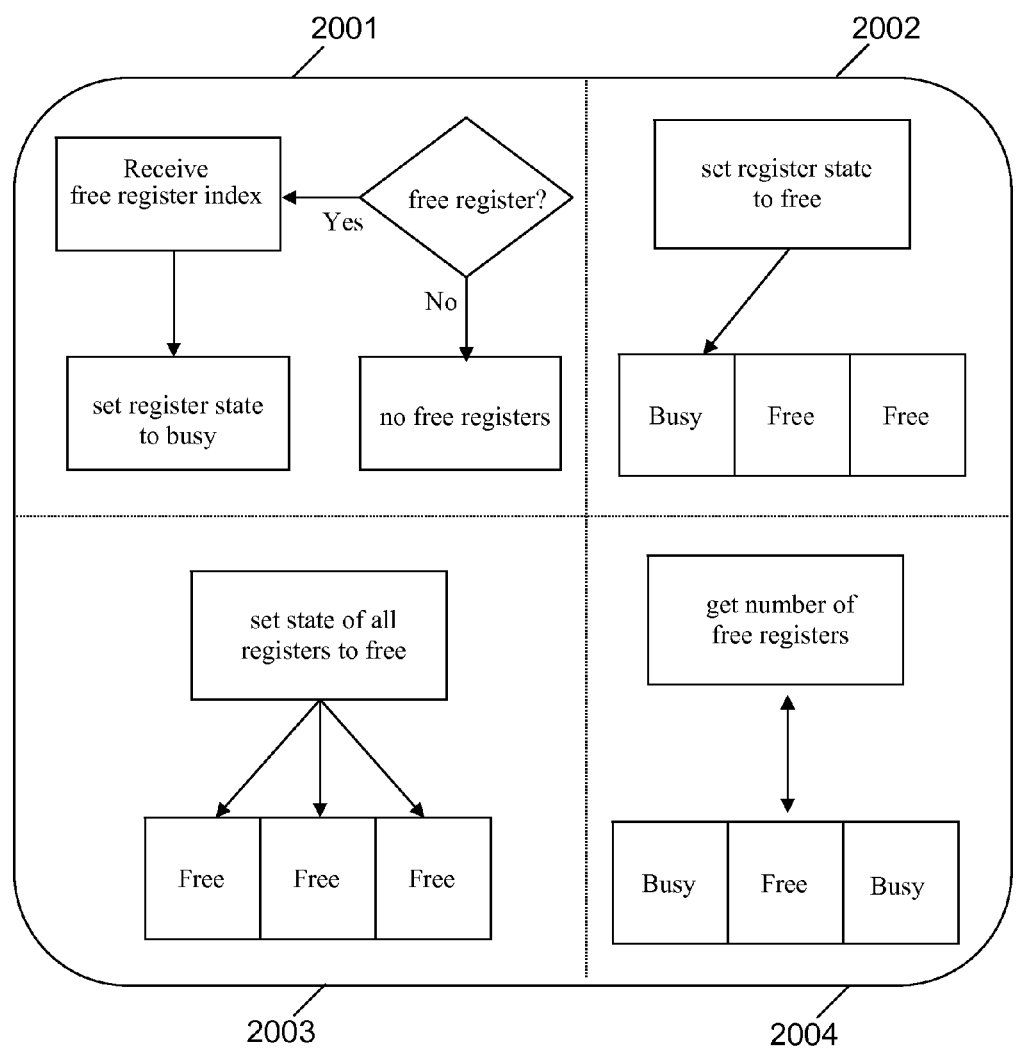
FIG. 20 depicts example embodiments of system-managed register instructions.

Referring now to FIG. 19, in connection with system-managed registers 1902, there is broadly contemplated herein, in a computer system 1901 having a set of system-managed registers 1902 that can be accessed by software 1904 only indirectly via a register index 1903, wherein the register index 1903 can be obtained by software 1904 only via checking the status 1906 of the set of system-managed registers 1902. Each register 1902 preferably has an attached state 1905 that indicates if the register is free or busy. Referring now to FIG. 20, a first instruction 2001 is preferably for receiving an index of a free register (if it exists) and setting the register state to busy; it otherwise receives a signal that indicates no register is free. A second instruction 2002 preferably sets the state of a register with a given index to free. A third instruction 2003 preferably sets the states of all the registers to free. A fourth instruction 2004 preferably provides an inquiry of the number of busy registers in the set of system-managed registers.

In connection with micro-architecture support, there is broadly contemplated herein, in a computer system having a processor and a latency prediction mechanism, which upon receiving an inquiry from the processor, provides an estimate of the latency of the operation (or set of operations) without actually executing the operation (or set of operations). The latency prediction mechanism preferably comprises a table that contains a latency or predicted latency for each operation (or set of operations). The latency prediction mechanism preferably provides a plurality of possible outputs, each output being indicative of a different latency range. In one embodiment, the latency prediction mechanism provides two outputs, a first output being for the indication of a low latency, and a second output being for the indication of a high latency. The first output may preferably be for on-chip cache or memory operation latency, and the second output may preferably be for an off-chip cache or memory operation latency.

There is broadly contemplated herein, in a computer system having a processor and a cost prediction mechanism, which upon receiving an inquiry from the processor, provides an estimate of the cost of the operation (or set of operations) without actually executing the operation (or set of operations). The cost is preferably based on at least one of latency, bandwidth, power, reliability, security or any other architecture or software metric. The cost prediction mechanism preferably comprises a table that contains a cost or predicated cost for each operation (or set of operations). The cost prediction mechanism preferably provides a plurality of possible outputs, each output being indicative of a different cost range. The cost prediction mechanism preferably provides two outputs, a first output being for indication of a very cost, and a second output being for indication of a high cost.

There is broadly contemplated herein, in a computer system having a processor, a cache and a memory, a memory latency prediction mechanism, which upon receiving an inquiry from the processor, provides an estimate of the latency of the memory access operation without actually executing the operation. Preferably, the memory latency prediction mechanism comprises a table that contains a predicted latency for each address (or set of addresses). Preferably, each predicted latency has an associated probability. The memory latency prediction table may be a lookup table, a hash table, or a set associative table. Preferably, the memory latency prediction may be based on an on-chip cache directory. Preferably, the latency prediction mechanism provides a plurality of possible outputs, each output being indicative of a different latency range. The predicted latency may depend on whether an address is cached in a cache or memory, and which cache or memory (in the cache and memory hierarchy) contains the data. The predicted latency may depend on whether an address is cached in a cache bank, and which cache bank contains the data; on whether an address is cached in a cache, and the cache state of the address; on whether an address is cached in a local cache on the same processor or the same chip, or a remote cache in a different processor; or on the latency to receive the data from the closest place that contains the accessed data. A first output may preferably represent on-chip cache latency, and a second output may preferably represent off-chip cache or memory latency.

It should be appreciated that the systems contemplated hereinabove may be employed in a wide variety of environments, including multiprocessor systems.

It is to be understood that the present invention, in accordance with at least one presently preferred embodiment, includes at least one of the following groups of elements (A), (B), (C), (D) and (E):

(A) computer instruction set architecture comprising: an inquiry instruction for making an inquiry of at least one characteristic of at least one operation; wherein at least one of the following is performed in connection with the operation: (a) the inquiry is made without the at least one operation being performed; (b) if the at least one characteristic satisfies at least one condition, the at least one operation is performed; yet if the at least one characteristic does not satisfy the at least one condition, the at least one operation is not performed and the at least one characteristic of the at least one operation is reported; (c) if the at least one characteristic satisfies at least one condition, the at least one operation is performed; yet if the at least one characteristic does not satisfy the at least one condition, the at least one operation is performed in an alternate mode that does not block subsequent operations from being executed; and (d) the inquiry is made after the at least one operation is performed;

(B) a computer system comprising: a processor; and a set of registers accessible by software only indirectly via indexing;

(C) a computer system comprising: a processor; a memory; and a prediction mechanism; the prediction mechanism being adapted, upon receiving an inquiry from the processor, to provide an estimate of at least one characteristic of at least one operation without executing the at least one operation;

(D) an arrangement for carrying out a process comprising the steps of: generating an address of an operand; inquiring as to whether the operand is available for reading or writing; performing one of the following (a) or (b): (a) if the operand is available, performing an operation immediately; (b) if the operand is not available, recording the operand in a data structure and issuing an operation intended to make the operand available after a predetermined time; and (E) an arrangement for carrying out a process comprising the steps of: generating the address of an operand, performing one of the following (a) and (b): (a) employing a split-phase operation to attempt to read or write the operand; (b) determining whether a split-phase operation will succeed or fail; performing one of the following (c) or (d): (c) if a split-phase operation succeeds, or it is determined that a split-phase operation will succeed, repeating the generating step after performance of a split-phase operation; (d) if a split-phase operation fails, or it is determined that a split-phase operation will fail, recording in a data structure either an address or other information related to a split-phase operation; consulting a data structure to determine whether a deferred split-phase operation has completed; performing one of the following (e) or (f): (e) if a deferred split-phase operation has completed, extracting information from the consulted data structure and repeating the generating step; (f) if a deferred split-phase operation has not completed, either: waiting for a deferred split-phase operation to complete; or performing other operations until a deferred split-phase operation has completed and then repeating the generating step.

Together, the elements in any of (A), (B), (C), (D) and (E) as set forth immediately hereabove may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

APPENDIX

Implementation Techniques

In this appendix, it is shown how high level constructs can be compiled into machine language using the split-phase memory instructions added to the architecture in accordance with present invention. FIG. 13 shows how code is generated for a single memory operation that could miss in the cache. FIG. 14 shows how this can be generalized to a sequence of dependent loads.

REFERENCES

[1] ARVIND, NIKHIL, R. S., AND PINGALI, K. K. I-structures: data structures for parallel computing. *ACM Trans. Program. Lang Syst.* 11, 4 (October 1989), 598-632.

[2] CULLER, D. E., ARPACI-DUSSEAU, A. C., GOLDSTEIN, S. C., KRISHNAMURTHY, A., LUMETTA, S., VON EICKEN, T., AND YELICK, K. A. Parallel programming in Split-C. In *Supercomputing* (1993), pp. 262-273.

[3] HOROWITZ, M., MARTONOSI, M., MOWRY, T. C., AND SMITH, M. D. Informing memory operations: memory performance feedback mechanisms and their applications. *ACM Trans. Comput. Syst.* 16, 2 (1998), 170-205.

[4] INTEL CORPORATION. *IA-64 Application Developer's Architecture Guide*, 1999.

[5] JONES, R., AND LINS, R. *Garbage Collection*. John Wiley and Sons, 1996.

[6] MAY, C., SILHA, E., SIMPSON, R., AND WARREN, H., Eds. *The PowerPC Architecture*, second ed. Morgan Kaufmann, San Francisco, Calif., 1994.

[7] MCCARTHY, J. Recursive functions of symbolic expressions and their computation by machine. *Commun. ACM* 3, 4 (1960), 184-195.

[8] MORRIS, D. C., AND HUNT, D. B. Computer system having an instruction for probing memory latency, October 2001. U.S. Pat. No. 6,308,261. See also European Patent Application 0-933-698.

[9] MOWRY, T. C., AND RAMKISSOON, S. R. Software-controlled multithreading using informing memory operations. In *Proceedings of the Sixth International Symposium on High-Performance Computer Architecture* (Toulouse, France, January 2000), pp. 121-132.

[10] SILHA, E., WOTTRENG, A., AND MAY, C. *PowerPC AS Instruction Set Architecture*, 1999.

[11] TENDLER, J. M., ET AL. POWER4 system microarchitecture. *IBM J. Res. Dev.* 46, 1 (January 2002), 5-25.

[12] WULF, W. A., AND MCKEE, S. A. Hitting the memory wall: implications of the obvious. *SIGARCH Computer Architecture News* 23, 1 (March 1995), 20-24.

What is claimed is:

1. A computer system comprising:
one or more system-managed registers, each of the one or more system-managed registers having a register state indicating whether the one or more system-managed registers are free or busy;
software configured to access the one or more system-managed registers only indirectly via a register index, wherein the register index can be obtained by the software only via checking the register state of the one or more system-managed registers;
a first instruction configured to provide an index of one of the one or more system-managed registers with a free register state; and
a number-providing instruction configured to provide a number indicating how many of the one or more system-managed registers have a busy register state.

2. The computer system according to claim 1, wherein, responsive to providing an index of the one of the one or more system-managed registers with a free register state, the first instruction is further configured to set the register state of the one of the one or more system-managed registers to busy.

3. The computer system according to claim 2, wherein responsive to none of the one or more system-managed registers having a free register state, the first instruction is configured to provide an indication that no register is free.

4. The computer system according to claim 1, further comprising:
a second instruction configured to set the register state of one of the one or more system-managed registers with a given index to free;
a third instruction configured to set the register state of all of the one or more system-managed registers to free; and
the number-providing instruction comprising a fourth instruction.

5. A computer-implemented method comprising:
configuring one or more system-managed registers to have a register state indicating whether the one or more system-managed registers are free or busy;
providing access, to software, to the one or more system-managed registers only indirectly via a register index, wherein the register index can be obtained by the software only via checking the register state of the one or more system-managed registers;

configuring a first instruction to provide an index of one of the one or more system-managed registers with a free register state; and configuring a number-providing instruction to provide a number indicating how many of the one or more system-managed registers have a busy register state.

6. The computer-implemented method according to claim 5, wherein configuring the first instruction further comprises:

configuring the first instruction to set a register state to busy responsive to providing an index of the one of the one or more system-managed registers with a free register state.

7. The computer-implemented method according to claim 6 wherein configuring the first instruction further comprises:

configuring the first instruction to provide an indication that no register is free responsive to none of the one or more system-managed registers having a free register state.

8. The computer-implemented method according to claim 5, further comprising:

configuring a second instruction to set the register state of one of the one or more system-managed registers with a given index to free; and configuring a third instruction to set the register state of all of the one or more system-managed registers to free;

wherein the number-providing instruction comprises a fourth instruction.

* * * * *